US007980692B2

(12) United States Patent
Fisher et al.

(10) Patent No.: US 7,980,692 B2
(45) Date of Patent: Jul. 19, 2011

(54) SELECTING AND/OR DESIGNING OPHTHALMIC LENSES

(75) Inventors: Scott Warren Fisher, Flagstaff Hill (AU); Saulius Raymond Varnas, Brighton (AU); John Charles Bonnett, Panorama (AU)

(73) Assignee: Carl Zeiss Vision Australia Holdings Ltd., Lonsdale (AU)

( * ) Notice: Subject to any disclaimer, the term of this patent is extended or adjusted under 35 U.S.C. 154(b) by 1849 days.

(21) Appl. No.: 10/498,745

(22) PCT Filed: Dec. 13, 2002

(86) PCT No.: PCT/AU02/01690
§ 371 (c)(1),
(2), (4) Date: Jan. 21, 2005

(87) PCT Pub. No.: WO03/052491
PCT Pub. Date: Jun. 26, 2003

(65) Prior Publication Data

US 2005/0122472 A1 Jun. 9, 2005

(30) Foreign Application Priority Data

Dec. 14, 2001 (AU) ..................................... PR 9491

(51) Int. Cl.
*G02C 7/02* (2006.01)

(52) U.S. Cl. ........................................ 351/177; 351/159

(58) Field of Classification Search .......... 351/159–172, 351/177
See application file for complete search history.

(56) References Cited

U.S. PATENT DOCUMENTS 6,199,983 B1 * 3/2001 Kato et al. .................... 351/169

FOREIGN PATENT DOCUMENTS

| | | |
|---|---|---|
| EP | 0 281 754 | 1/1988 |
| FR | 27111822 | 10/1994 |
| JP | 03-206417 | 9/1991 |
| JP | 09-043102 | 2/1997 |
| JP | 10-115808 | 5/1998 |
| WO | WO 98/16862 | 4/1998 |
| WO | WO 01/25837 | 4/2001 |

OTHER PUBLICATIONS

English Translation of Office Action issued in Japanese Application No. 2003-553320, dated Jun. 10, 2008.

* cited by examiner

*Primary Examiner* — Darryl J Collins
(74) *Attorney, Agent, or Firm* — Buchanan Ingersoll & Rooney PC

(57) ABSTRACT

The present invention involves the prescribing and/or dispensing ophthalmic lenses, such as progressive addition lenses, for a wearer. In one form of the invention lens usage information is obtained from a wearer and entered into a programmed computer. The programmed computer processes the lens usage information to provide a separate weighted lifestyle score for each of one or more respective lifestyle score categories, such that each weighted lifestyle score is a function of a predetermined relationship between the respective lifestyle score category and at least ophthalmic lens design feature. The programmed computer then selects or designs an ophthalmic lens design using one or more of the weighted lifestyle scores such that the selected or designed ophthalmic lens has at least one lens design feature which has been customised using one or more of the weighted lifestyle scores.

29 Claims, 3 Drawing Sheets

14
Near Use Category
Activity
Activity Scores
Dynamic Vision Use Category
Activity
Activity Scores
15
Lens Design Database
Lens Designs
Activity Scores
Wearer Specification
Activities
Lens Design
24
Wearer Data
Lens Usage Information
Prescription Data
Fitting Data
Personal Data
Sampled Behavioural Data
26
28
30
31
22
12
4
8
10

| Lens Usage Information | | | |
|---|---|---|---|
| Activity | | Lens Usage Factors | |
| $A_1$ | Golf | $T_1$ | 0.01 |
| $A_2$ | Reading | $T_2$ | 0.6 |
| $A_3$ | Gardening | $T_3$ | 0.04 |
| ⋮ | ⋮ | ⋮ | ⋮ |
| $A_n$ | Driving | $T_n$ | 0.4 |

Figure 3

| Activity Score Category: Near Score | | | |
|---|---|---|---|
| Activity | | Activity Score | |
| $A_1$ | Golf | $S_1$ | 1.75 |
| $A_2$ | Reading | $S_2$ | 10 |
| $A_3$ | Gardening | $S_3$ | 4 |
| ⋮ | ⋮ | ⋮ | ⋮ |
| $A_n$ | Driving | $S_n$ | 1 |

Figure 4

SELECTING AND/OR DESIGNING OPHTHALMIC LENSES

This application claims priority to PCT Application No. PCT/AU02/01690, filed on Dec. 13, 2002, now International Publication No. WO 03/052491 A1, published Jun. 26, 2003, which claims priority to Australian Patent No. PR 9491, filed Dec. 14, 2001.

FIELD OF INVENTION

The present invention relates to a system and process for prescribing and/or dispensing ophthalmic lenses for a wearer. In particular, the present invention provides a system and process which is able to be used to select or design an ophthalmic lens for a wearer based upon lens usage information provided by a wearer.

It is envisaged that the process and system of the present invention will provide particular benefits when used for dispensing that involves the selection of a suitable progressive addition lens design for an individual wearer. However, it is to be appreciated that the present invention is not to be limited to only this aspect of dispensing, nor only to dispensing per se. Indeed, and as will be described in more detail below, the process and system of the present invention may also find beneficial uses in other dispensing aspects (and also in aspects of prescription), and may for example be useful for the custom generation of progressive addition lenses to suit individual wearer's needs or in the dispensing of non-progressive lenses (for example, single vision lenses, multi-focal lenses and wrap optics such as wrap lenses).

BACKGROUND OF THE INVENTION

The dispensing of an ophthalmic lens which meets the individual requirements of a wearer is an important factor in determining wearer satisfaction.

Whilst it is relatively common for lens dispensers to consider very basic requirements of a wearer (for example, prescription) and to dispense a lens according to the these types of requirements, such an approach is quite limited. Consequently, although by using such an approach a lens design may be dispensed which has a suitable prescription, the lens may have other features which render the lens unsuitable for the individual needs of the wearer.

Moreover, in recent years the availability of a large number of different lens designs has complicated the dispensing process, and thus rendered the dispensing process more difficult. Indeed, a good example of the difficulty faced by dispensing lenses having a complex design is progressive addition lens.

Conventional progressive addition lenses are one-piece lenses which have an upper distance portion ('the distance zone'), a lower near portion ('the near zone'), and a progressive corridor ('the intermediate zone') therebetween which provides a gradual power progression from the distance zone to the near zone without any dividing line or prismatic jump.

Although early progressive lenses were somewhat crude in design, they have consistently improved in performance over the past few decades. The improvement in performance has been a causative factor in significantly increasing patient demand for these categories of lenses to the point where lens dispensers and manufacturers today offer an array of different progressive lens designs. There is thus available to a dispenser a large number of lens designs that may be dispensed to a wearer, each of which would be suitable to meet that wearer's prescription requirements.

The provision of a range of progressive lens designs presents a lens dispenser with something of a dilemma. The dilemma lies in the fact that in increasing the number of different lens designs which are available to be dispensed to a particular wearer, there is an associated increase in the complexity of the decision making process involved in selecting a lens design which is best suited to the wearer's individual needs.

The selection of a particular lens design from the array of available lens designs for an individual wearer, and the subsequent fitting of the selected lens design to a frame to form spectacles for use by the wearer, are of critical importance to the effectiveness of, and thus the wearer satisfaction with, the resultant spectacles.

Ideally, the process of selecting a progressive lens design for an individual wearer includes selecting a lens design having a power distribution which is 'matched' to an individual wearer's needs. In this respect, the power distribution of a progressive addition lens may be described in terms of a number of design parameters. Examples of design parameters which may be relevant include:

(a) the length of the power progression;
(b) the shape of the progressive corridor;
(c) size, shape and location of the near, intermediate and distance zones;
(d) blur gradients across boundaries of peripheral zones;
(e) specific aspherisation of the near and distance zones; and
(f) the design of peripheral zones.

In light of the number of design parameters which may be varied, selecting a progressive addition lens which is suitable for a wearer's individual needs is a matter of making trade offs. For example, increasing the size of the near zone may improve the near viewing performance, but may have a corresponding degrading effect on the distance viewing performance and active vision performance by increasing the levels of blur and distortion elsewhere in the lens.

Unfortunately, given the large array of PAL products on the market and the almost infinite combinations and permutations of the design parameters, and the variety of tasks for which a lens may be used, selecting a lens design (from a dispensers perspective) or designing a lens (from a designers perspective) which is suitable for an individual wearer's needs has proven to be somewhat difficult. Therefore, when selecting a progressive lens for a wearer, many dispensers miss the opportunity to fit a lens which has been selected on the basis of the wearer's needs because they instead fit a favorite, trusted lens design.

If a dispenser does attempt to custom fit a progressive lens design, they are often limited by their experience, design knowledge which they have personally developed and/or data supplied by a lens manufacturer. Such limitations may have negative consequences for the consistency of the dispensing process between different retail locations or within retail locations where several dispensers may work. Thus, the same wearer may be offered very different lens design solutions. In this scenario, then, the lens design offered to a customer may depend on:

(a) which dispenser a customer consults with;
(b) a dispensers experience and prejudices;
(c) sales targets of the store;
(d) the number of designs that a dispenser can hold in memory; and
(e) the type of information the manufacturer has supplied on which to make dispensing decisions.

Different wearers, though, typically have different lens usage requirements, some of which may be related to the wearer's lifestyle (for example, a wearer's vocational and avocational activities). Different vocational and avocational activities may encompass different ranges of accommodative demands due to, for example, variation in the working distance requirements of the activity and the nature and relative motion of the visual targets associated with the activity. Thus, different activities may warrant different considerations in the selection of an appropriate lens design.

To accommodate such variations, some lens designs have been developed specifically for particular activities (for example, for computer users who have high intermediate vision demand coupled with high near vision demands). However, providing a lens design which is optimised for a particular activity (for example, reading) is often detrimental to the vision performance for other tasks which the wearer performs.

As a result, many dispensers prescribe single vision lenses for such activities as golf or tennis in preference to a progressive addition lens. Although such an approach may provide a lens design which is suitable for a particular activity, it may force the wearer to wear different spectacles for activities having different working distances (for example, one set of spectacles for reading and another for playing golf).

It is an aim of the present invention to provide a method and a system that can be used on-site by a dispenser, at least to select or design a suitable lens design, such as a progressive addition lens design, based upon lifestyle and/or other information provided by the wearer, preferably in a reasonably short period of time.

SUMMARY OF THE INVENTION

The present invention relies on the use of a programmed computer, or computer network, to process lens usage information and/or preferably other data for a wearer so as to select or design an ophthalmic lens which is suitable for use by a wearer, the types of ophthalmic lens designs which are able to be selected and/or designed include single vision lenses, multi-focal lenses and progressive addition lenses.

Thus, in its most general form, the present invention provides a process of prescribing and/or dispensing ophthalmic lenses for a wearer, the process being performed by or with the aid of a computer and including the steps of:

(a) obtaining lens usage information for a wearer;
(b) processing the lens usage information so as to calculate a weighted lifestyle score for each of one or more lifestyle categories; and
(c) using one or more of the weighted lifestyle scores to select or design an ophthalmic lens suitable for use by the wearer.

However, in its most preferred form the present invention prescribes and/or dispenses ophthalmic lenses for a wearer using weighted lifestyle scores. Thus, in this form of the invention, the process includes the steps of:

(a) obtaining lens usage information from the wearer;
(b) entering the lens usage information into a programmed computer;
(c) the programmed computer processing the lens usage information to provide a separate weighted lifestyle score for each of one or more respective lifestyle score categories, each weighted lifestyle score being a function of a predetermined relationship between the respective lifestyle score category and at least one ophthalmic lens design feature; and
(d) the programmed computer selecting or designing an ophthalmic lens design using one or more of the weighted lifestyle scores;

wherein the selected or designed ophthalmic lens has at least one lens design feature which has been customised using one or more of the weighted lifestyle scores.

Reference to the term 'lens usage information' throughout this specification is to be understood to be reference to information which describes lifestyle patterns of the wearer (either vocational or avocational) which the wearer predicts will require the use of spectacles having ophthalmic lenses.

In a particularly preferred form of the invention, the lens usage information is able to be obtained from a wearer using a questionnaire or during an interview process.

Ideally, the lens usage information obtained from a wearer includes a list of activities (for example, golf, reading) during which the wearer intends to wear the ophthalmic lenses, together with information (herein referred to as 'lens usage factors') which is indicative of a proportion of time that the wearer intends to use the lenses for the respective activity.

A lens usage factor may be described in terms of a ratio. For example, the lens usage factor may be expressed as a percentage of lens usage, or the number of hours a day that a wearer intends to use the lens for a particular activity (for example, golf may be an activity that the wearer spends 5% of their time playing). Ideally, the lens usage information may also include information which is indicative of the importance of each activity to the wearer.

In one form of the invention, the questionnaire may be provided using a programmed computer having a video display and an application program which enables a wearer to interact with a graphical user interface (GUI). Ideally, the GUI is able to prompt a wearer, or other person, for responses to a number of questions so structured to obtain the requisite information. Advantageously, the obtained lens usage information may be stored in a computer readable file for subsequent processing.

Subsequent to entering the lens usage information into the programmed computer, the lens usage information is processed by the programmed computer to provide a weighted lifestyle score for each lifestyle score category. In this respect, reference to the term 'weighted lifestyle score' throughout this specification is to be understood to be reference to an index which is a function of the predetermined relationship which exists between a lifestyle score category and an ophthalmic lens design feature.

In a particularly preferred embodiment of the present invention, the processing of the lens usage information to provide a weighted lifestyle score for a respective lifestyle score category includes the steps of:

(a) obtaining a separate activity score for each activity in a list of activities;
(b) calculating a separate proportional score for each activity, wherein the proportional score is calculated using the product of the activity score and the respective usage factor; and
(c) calculating the weighted lifestyle score for the list of activities, wherein the weighted lifestyle score is calculated using the sum of the separate proportional scores.

In this respect, reference to the term 'activity score' throughout this specification is to be understood to be reference to an index which is indicative of the extent to which visual tasks associated with an activity combine to affect the characteristics of an ophthalmic lens design feature having a predetermined relationship with a respective lifestyle score category.

In the preferred form of the invention, each lifestyle score category includes at least one task category, wherein each task category further includes a range of task subcategories, each having a task score.

The process of obtaining a separate activity score for a particular activity and activity category preferably includes:

(a) categorising the activity using at least one task subcategory according to the visual requirements of the activity;

(b) obtaining the task score for each task subcategory used to categorise the activity;

(c) calculating a task subcategory proportional score for each task subcategory using the product of the task score and a proportional factor; and (d) calculating an activity score for each activity, wherein the activity score is the sum of the subcategory proportional scores.

Where the ophthalmic lens is a progressive addition lens, a lifestyle score category may be provided for a frequency of near vision use (herein referred to as the 'near vision lifestyle score category'). Here, the separate activity scores are able to be derived from an assessment of the near vision use requirements associated with an activity.

An activity score corresponding to the near vision lifestyle score category will preferably be expressed in terms of a position on a continuum which extends from 0% near dominant (that is, distant dominant) through to 100% near dominant. For example, in one form of the invention where an activity score of 10 equates to 100% near dominant and an activity score of 0 equates to 0% near dominant, an activity such as drawing may have an activity score of 10, whereas an activity such as watching television may have an activity score of 2.

In yet another form of the invention a lifestyle score category is also provided for frequency of use of dynamic vision (herein referred to as the 'dynamic vision lifestyle score category'). Here, activity scores are derived from an assessment of the relative motion between the wearer and a target for each activity.

In this form of the invention, the assessment of the relative motion characteristics will preferably be expressed in terms of a position on a continuum from 0% (that is, where a viewing target and wearer are stationary with respect to one another) through to 100% (that is, where a viewing target and the wearer are moving rapidly with respect to one another). For example, in one form of the invention where an activity score of 10 equates to a 100% dynamic vision requirement and an activity score of 0 equates to a 0% dynamic vision requirement, an activity such as jogging may have an activity score of 8, whereas an activity such as watching television may have an activity score of 2.

In a preferred embodiment of the present invention, the step of obtaining a separate activity score for each activity in the list of activities for a particular lifestyle score category is performed by accessing a database which contains pre-calculated activity scores for a range of activities.

The database may reside on the programmed computer or on a database server which is accessible to the programmed computer via a network. In one form of the invention, where the database resides on a database server, the database server may employ server side scripting (for example, using Active Server Pages). Accordingly, the present invention also provides a computer network suitable for prescribing and/or dispensing ophthalmic lenses for a wearer, the network including (a) a client computer including computer software to direct the client computer to:

i. prompt a user to enter lens usage information for a wearer into the client computer;

ii. accept the lens usage information;

iii. process the lens usage information to provide a separate weighted lifestyle score for each of one or more respective lifestyle score categories, each weighted lifestyle score being a function of a predetermined relationship between the respective lifestyle score category and at least one ophthalmic lens design feature;

iv. assemble a database query using the separate weighted lifestyle scores;

v. communicate the query to a database located on a server computer said communication taking place via a communications link; and (b) one or more server computers, each server computer including computer software to direct a respective server computer to:

i. receive the database query;

ii. process the database query, said processing including indexing a database to select or design an ophthalmic lens design using one or more of the weighted lifestyle scores; and iii. communicate the selected or designed ophthalmic lens design to the client computer.

Ideally, the database includes a separate table (herein referred to as a lifestyle category table) for each lifestyle category. Preferably, each lifestyle category table includes a plurality of records for activities (herein referred to as activity records), each activity record having a field having an activity score value.

Thus, in this form of the invention, the separate activity score is able to be obtained for a particular activity and lifestyle category by querying the database and retrieving the activity score from the corresponding activity record from a lifestyle category table. Thus, in this form of the invention, the processing of the lens usage information to provide a weighted lifestyle score for a respective lifestyle score category preferably includes the steps of:

(a) accessing a database, wherein the database contains pre-calculated activity scores for a plurality of activities;

(b) retrieving a pre-calculated activity score from the database for each activity;

(c) calculating one or more proportional activity scores for each activity using the product of the retrieved activity score and the respective proportional factor; and (d) calculating one or more weighted lifestyle scores, each weighted lifestyle score being calculated using the summation of the proportional activity scores.

In one form of the invention, where the database does not contain activity scores for a particular activity, an operator is able to enter data for activities not included in the database into the database. In this form of the invention, the process of adding data for an activity to the database includes:

(a) entering a descriptor for the activity into the database using a descriptor field;

(b) entering and/or selecting at least one task category for linking with the activity descriptor, wherein the at least one task category is associated with a lifestyle score category;

(c) for each task category, entering estimates for the proportions of one or more task sub-categories for each task category;

(d) the programmed computer calculating an activity score for each activity score category associated with the activity descriptor using the task sub-category proportional estimates and respective task scores; and (e) storing each activity score together with the activity descriptor in the database.

Ideally, where the database resides on the program computer, data added to the database is able to be communicated over a network so as to enable the entered data to be standardised or shared amongst other systems of the present invention located at different installations.

In a preferred form of the present invention which selects an ophthalmic lens design from a matrix of existing lens designs the matrix may be provided using a database table, which is accessible to the programmed computer. Preferably, the table includes a plurality of lens records, each lens record containing information for an available lens design.

Ideally, the lens records will be arranged using a plurality of fields, one or more of which will contain a lifestyle score value (either in the form of a single number or a range of numbers) for a respective lifestyle score category (herein referred to as a lifestyle score category field). Preferably, additional fields will be provided for other information (for example, product name).

Each lens record may also contain predetermined lens scores for particular design features of available lens designs. In this respect, the lens records may also include predetermined scores for near vision performance, intermediate vision performance, distance vision performance, corridor length, refractive index, specific gravity, adaptation score, impact strength, polarising performance, margin and the cost of each available lens, the actual score types being dependent upon the type of lens.

Preferably, the step of selecting an ophthalmic lens design using one or more of the weighted lifestyle scores is accomplished by querying the database to locate and retrieve at least one available ophthalmic lens design having one or more lifestyle score category fields containing a lifestyle score value which matches the one or more weighted lifestyle scores.

In terms of designing an ophthalmic lens using one or more of the weighted lifestyle scores, in circumstances where the programmed computer is unable to locate an ophthalmic lens design which matches the one or more weighted lifestyle scores, the programmed computer may create a data file which is able to be used to fabricate a customised ophthalmic lens design.

In yet another embodiment of the invention, the inventive process may initially select a lens design from a pre-existing range of ophthalmic lens designs according to the lifestyle scores and then modify the selected design according to other wearer parameters such that the modified design is customised according to the visual needs of the wearer.

The selected or designed ophthalmic lens design will have at least one lens design feature which has been customised using a weighted lifestyle score for a particular lifestyle score category. For example, and in terms of selecting or designing a progressive addition lens which is suitable for a wearer, in one form of the invention where the lifestyle score category is the near vision lifestyle score category, a wearer having a high near vision use weighted lifestyle score will receive a progressive lens design having a larger near area whereas a wearer having a low near vision use weighted lifestyle score will receive a progressive lens design having a larger clear distance zone.

Similarly, where the lifestyle score category is the dynamic vision lifestyle score category, a wearer having a low dynamic vision weighted lifestyle score will receive a progressive lens design having large clear zones of vision with peripheries optimised for minimum blur, whereas a wearer having a high dynamic vision weighted lifestyle score will receive a progressive lens design having smaller clear zones of vision and peripheries optimised to reduce sagittal addition power in the periphery or rate of change circumferential prism.

Furthermore, and with reference now to the material used to manufacture a progressive lens for a wearer, a wearer having a high dynamic vision weighted lifestyle score may receive a lens design manufactured using polycarbonate or other impact resistance material whereas wearers having a low dynamic vision weighted lifestyle score may receive a lens manufactured using materials biased towards cosmetic improvements (for example, low chromic aberration or higher index for thinner lenses). A wearer with a prescription of high power (positive or negative) may receive a higher index material to reduce edge thickness and/or weight. Material may also be selected based on its chromatic aberration qualities trading all other factors against higher chromatic aberration numbers (lower chromatic aberration) to improve optics or vice verse.

According to an alternative embodiment of the present invention, the step of obtaining lens usage information from a wearer may also include obtaining other data (herein referred to as 'the supplementary data') from a wearer.

Ideally, the other types of data which are able to be used in the inventive process include fitting data, lens prescription data, personal data and sampled behavioural data. In this respect, reference to the term 'fitting data' throughout this specification is to be understood to be reference to geometric parameters (such as interpupillary distance, vertex distance (VD), pantoscopic tilt (PT), lens wrap and frame geometry) which affect the positioning of the lens with respect to the wearer's face. Furthermore, reference to the term 'lens prescription data' throughout this specification is to be understood to be reference to the sphere (Rx), cylinder (Cyl), addition (Add) and base curve. For the purposes of the present invention, reference to the term 'personal data' throughout this specification is to be understood to be reference to age and gender information of the wearer.

Finally, sampled behavioural data may include measured data which describes one or more of eye turn, eye declination, accommodation and reading distance of the wearer during, or obtained from, specific visual exercises.

In this form of the invention, the supplementary data is also able to be entered into the programmed computer and processed together with the lens usage information. Ideally, the processing is able to provide a lens design selection which uses the one or more of the weighted lifestyle scores together with the supplementary data. Thus, in this form of the invention, in addition to the selected ophthalmic lens having at least one lens design feature which has been customised using one or more of the weighted lifestyle scores, the selected lens design may also have at least one lens design feature which has been customised using the supplementary data.

The extent of the customisation will depend somewhat on the data set (that is, the set of data used from the lens usage and supplementary data) being used to customise the selected lens design.

In an embodiment of the invention where fitting data is used to customise a progressive addition lens design, the lens design features which may be customised on the basis of this data include:

(a) Near and distance inset (using the PD);

(b) Rx power compensation (using the VD and/or PT);

(c) PAL corridor length, lens material and periphery design (using the frame size and shape)

(d) Base curve (to avoid lash clash, or on the basis of selecting a base curve to satisfy an aesthetic or cosmetic requirement); and (e) Zone width and eye path inset profile (using sampled behavioural data).

In relation to the customisation of a progressive addition lens design using the inter pupillary distance (PD) of a wearer, here, as the wearer's PD increases, the amount of convergence required to fixate a target at less than infinite object distance increases (for example, narrow PD's require less convergence). Thus, by measuring the PD of a wearer, the location of the near and distance zones is able to be customised.

Pursuant to the preferred form of the present invention, the selection of a progressive lens design may further include customising the lens design using the prescription data. In this respect, reference to the term 'prescription data' is to be understood to be reference to sphere, cylinder and addition. The selection of a customised lens design may utilise all, or some of the prescription data (that is, Rx, Cyl and Add).

In relation to selecting or designing a progressive addition lens design using Rx, conventional semi-finished PAL are manufactured in a small number of base curves, each of which can be aspherised for only one particular Rx (typically spherical) but will be used to deliver a wide range of Rx's, including both spherical and cylindrical ones. Any departure from the Rx the conventional lens has been optimised for may degrade the peripheral optics by reducing the size of clear regions. The reduction in the size of clear regions increases proportional to the departure from the optimal Rx. Pursuant to the preferred form of the invention, then, the degrading effect of the departure is able to be compensated by individually aspherising the front and/or the back surface of the lens.

With reference to selecting or designing a progresive addition lens design using Cyl, the progressive addition lens design may be aspherised differently along two principal meridians to provide an optimised off-axis performance for a specific cylindrical prescription.

Finally, in relation to the use of Add to select or design a customised progressive addition lens design, since a higher Add leads to increased levels of blur, it may be beneficial to trade a longer corridor length and a higher residual Add at a Fitting Cross (FC) for a slight reduction of peripheral blur in these designs.

In a particularly preferred form of the present invention, the programmed computer may also be able to accept and process post dispensing information. In this respect, reference to the term 'post dispensing information' throughout this specification is to be understood to be information which has been provided by a dispenser, or a wearer, some time after a lens has been dispensed to the wearer.

Preferably, then, the post dispensing information will be gathered using a separate questionnaire which has been formulated using the lifestyle information which was provided by the wearer during the dispensing process.

The gathering of the post dispensing information may, in an ideal embodiment of this form of the invention, be performed by entering the post dispensing information directly into the programmed computer or, indeed, may be entered into a computer which is accessible to the programmed computer via a network (for example, the Internet).

The post dispensing information questionnaire may include questions which query the wearer as to their perceived suitability of the selected lens for the activities nominated by the wearer during the dispensing process. Preferably, the questionnaire may ask the wearer to identify specific problems or deficiencies with the selected lens design.

Once entered into the programmed computer, the post dispensing information is able to be processed by the programmed computer to assess the wearer satisfaction with the selected lens.

Advantageously, the processing of 'post dispensing information' may enable the programmed computer to modify dispensing algorithms used to select or design a lens design. Thus, the processing of the post dispensing information may enable the dispensing algorithms used to select or design a progressive addition lens design to be refined or improved.

The process of the present invention may be performed on a programmed device, accordingly, the present invention also provides a programmed device for prescribing and/or dispensing ophthalmic lenses for a wearer, the device including:

(a) data entry means for obtaining lens usage information from the wearer;

(b) processing means for:

i. processing the lens usage information to provide a separate weighted lifestyle score for each of one or more respective lifestyle score categories, each weighted lifestyle score being a function of a predetermined relationship between the respective lifestyle score category and at least one ophthalmic lens design feature; and ii. selecting or designing an ophthalmic lens design using one or more of the weighted lifestyle scores;

wherein the selected or designed ophthalmic lens has at least one lens design feature which has been customised using one or more of the weighted lifestyle scores.

The present invention also provides a computer program including computer program code means to make a programmable device execute:

(a) prompting a user to enter lens usage information for a wearer into the programmable device;

(b) accepting the lens usage information;

(c) processing the lens usage information to provide a separate weighted lifestyle score for each of one or more respective lifestyle score categories, each weighted lifestyle score being a function of a predetermined relationship between the respective lifestyle score category and at least one ophthalmic lens design feature; and (d) selecting or designing an ophthalmic lens design using one or more of the weighted lifestyle scores;

wherein the selected or ophthalmic lens has at least one lens design feature which has been customised using one or more of the weighted lifestyle scores.

The present invention also provides a computer readable memory, encoded with data representing a computer program, that can be used to direct a programmable device to:

(a.) prompt a user to enter lens usage information for a wearer into the programmable device;

(b.) accept the lens usage information;

(c.) process the lens usage information to provide a separate weighted lifestyle score for each of one or more respective lifestyle score categories, each weighted lifestyle score being a function of a predetermined relationship between the respective lifestyle score category and at least one ophthalmic lens design feature; and (d.) select or design an ophthalmic lens design using one or more of the weighted lifestyle scores;

wherein the selected or designed ophthalmic lens has at least one lens design feature which has been customised using one or more of the weighted lifestyle scores.

It will be recognised that the present invention includes a number of advantages in that the process is able to be used by a dispenser to select a suitable lens, such as a progressive lens, based upon a lifestyle assessment of a wearer. As a result, a dispenser is able to select a lens design which correlates with the lifestyle of the wearer. The invention is thus able to predict patterns of lens usage which satisfy the visual requirements that the optical, ergonomic and cosmetic demands that a wearer will place on spectacles having progressive addition lenses.

Advantageously, using this form of the invention, an operator is able to enter information for activities which are not included with the database (such as cultural specific activities specific to a particular country or location).

BRIEF DESCRIPTION OF THE DRAWINGS

The present invention will now be described in relation to various embodiments illustrated in the accompanying drawings. However, it must be appreciated that the following description is not to limit the generality of the above description.

In the drawings:

FIG. 3 shows an example of lens usage information suitable for use in the embodiment of FIG. 1; and FIG. 4 shows a table of activity scores for the activities included in the lens usage information of FIG. 3.

DETAILED DESCRIPTION OF THE INVENTION

Figure 1:
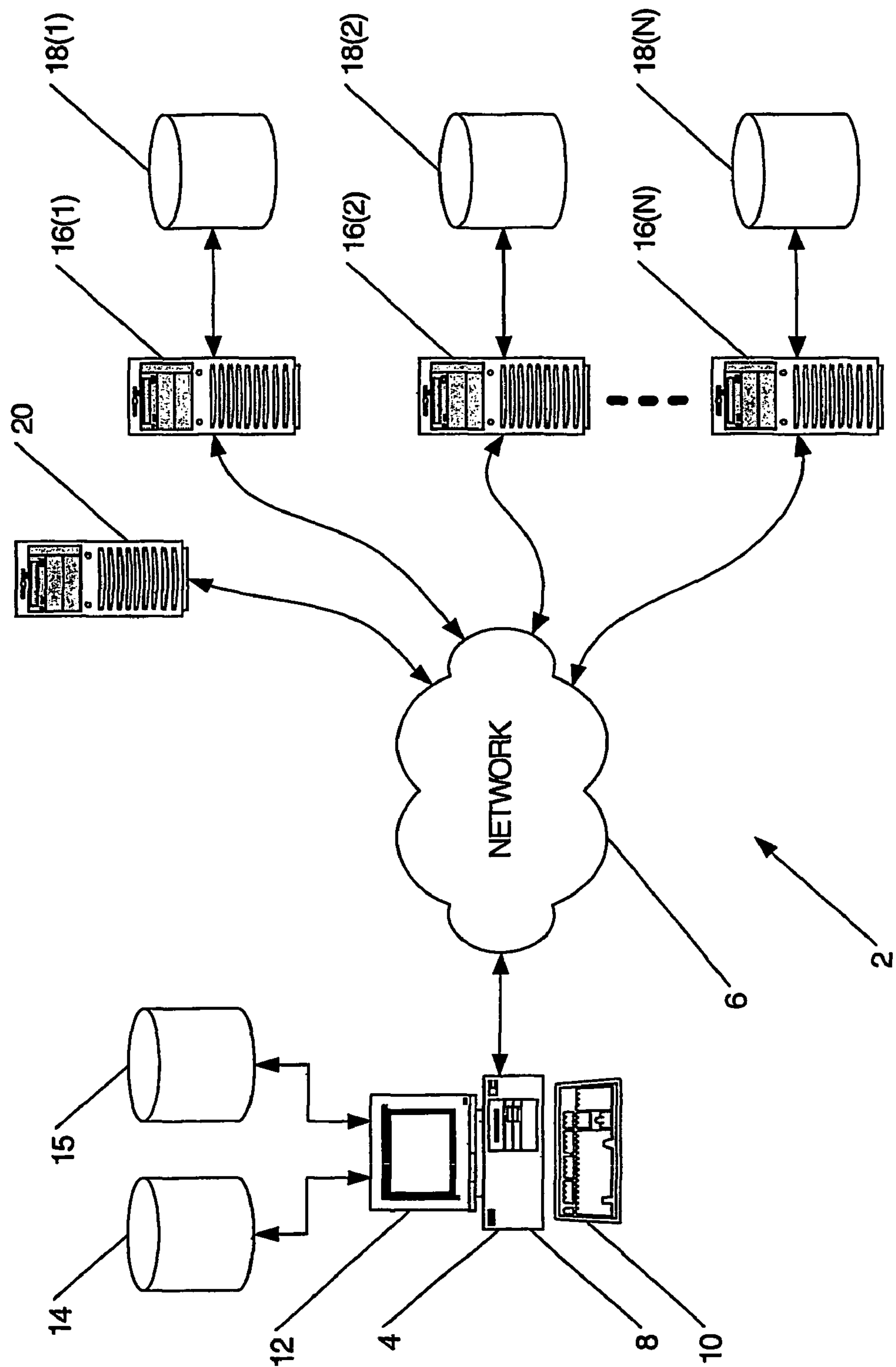
FIG. 1 shows a system block diagram of a system in accordance with a preferred embodiment of the present invention.

A system environment in which the present invention may be used is shown in FIG. 1. System environment 2 includes a computer 4 which may be a conventional desktop personal computer or workstation having the ability to connect to a network 6, such as the Internet, and being capable of running a software program 8 provided with the computer 4. Preferably, a plurality of merchant servers 16 and a manufacturer server 20 is also connected to the network 6.

The software program 8 includes components which provide the computer 4 with the ability to accept and process information obtained from a wearer (not shown). In this example, the obtained information is able to be entered into the computer 4 using a keyboard 10 on behalf of the wearer by a user (for example, an optometrist). Ideally, the software program 8 also includes components which enable the computer 4 to communicate with merchant servers 16 and/or manufacturer servers 20 over the network 6.

In relation to obtaining information from a wearer, in the preferred form of the present invention the information may be entered into the computer 4 using a graphical user interface 12 which is able to prompt a user to enter specific wearer information into the computer 4.

In response to accepting wearer information from a user, the computer 4 is able to process the wearer information using activity scores which have been retrieved from an activity database 14 to select a progressive lens design (herein referred to as 'the lens design') from a lens design database 15 according to processing of the wearer information.

In the example shown in FIG. 1, the activity database 14 and the lens design database 15 are provided with the computer 4, however these databases may be provided with an alternative computer (not shown) which is able to be accessed by the computer 4 over the network 6.

Ideally, once a lens design has been selected, the computer 4 is able to determine availability of the lens design by requesting lens availability information from one or more merchant servers 16 over the network 6. Each merchant server 16 is able to access a catalogue database 18 which includes information in relation to price and availability of the lens design. Price and availability information retrieved from a catalogue database is able to be provided to the computer 4 over the network 6.

In response to receiving the price and availability data, the computer 4 may place an order with the merchant server 16 which is able to provide the selected lens design at the best price and/or shortest lead time.

Alternatively, the placement of an order with a particular merchant server 16 may depend upon other commercial factors. For example, a dispenser may have a register of preferred merchants which is accessible to the computer 4. In this case, then, the placement of an order with a merchant server 16 may be as a result of identifying a preferred merchant as being able to supply the selected lens design.

In the event that the selected lens design is unavailable, the computer 4 may provide an alternative lens design selection, or may instead generate a data file for communication to a manufacturer server 20 so that a custom lens is able to be manufactured according to the lens design.

Figure 2:
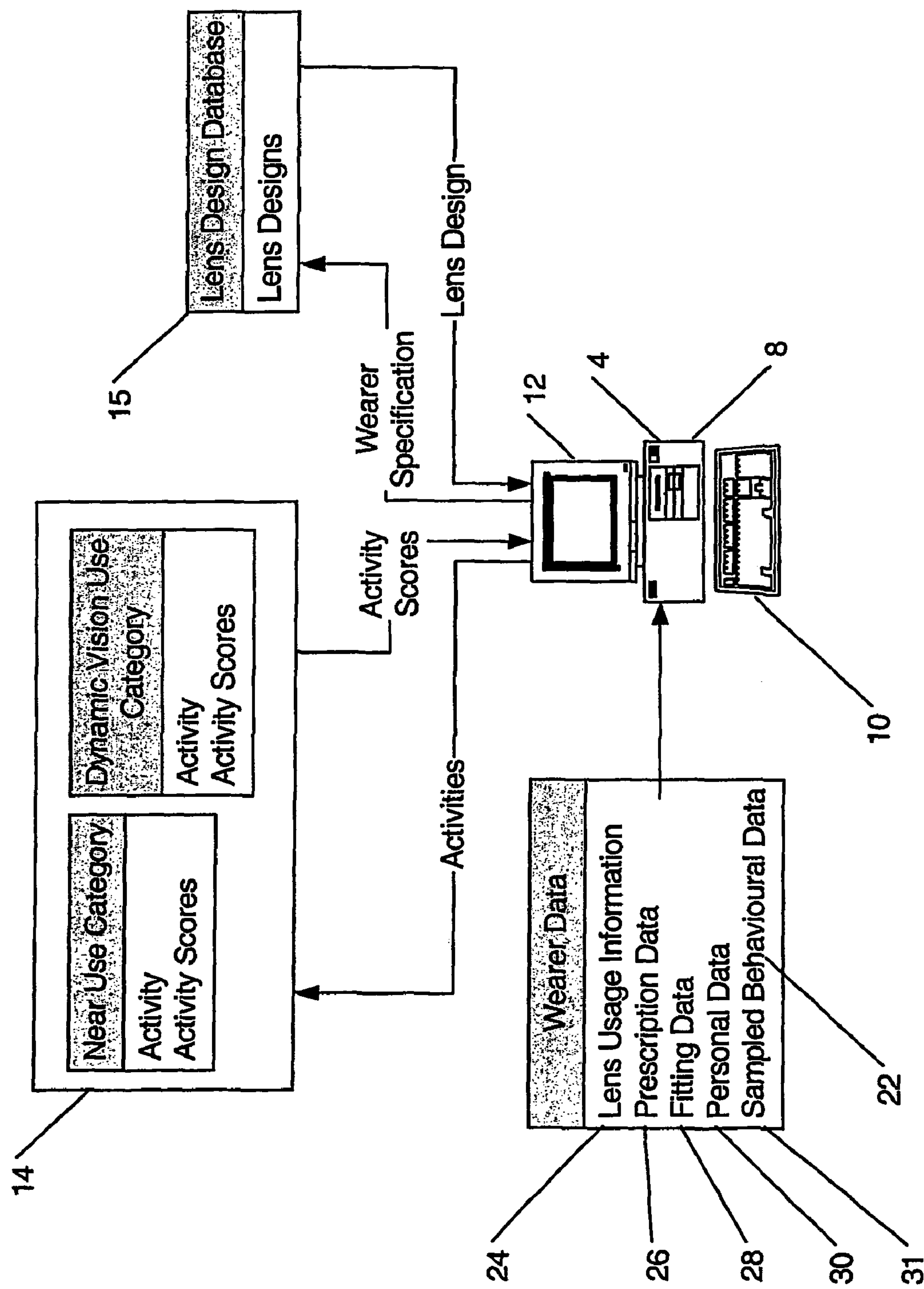
FIG. 2 shows a data flow diagram for the embodiment of FIG. 1.

Referring now to FIG. 2 the information 22 obtained from a wearer (herein referred to as the wearer data) preferably includes lens usage information 24, prescription data 26, fitting data 28, personal data 30 and sampled behavioural data 31. For the purposes of this description, the prescription data 26, fitting data 28, personal data 30 and sampled behavioural data 31 will be referred to as the 'additional data'. Thus, the wearer data 22 includes lens usage information 24 and additional data 26, 28, 30, 31.

Turning to FIG. 3, the lens usage information 24 may include a list of one or more activities 32, each activity having a respective lens usage factor 34. Each activity in the list of activities 32 is an activity which the wearer has predicted will require progressive addition lenses.

Lens usage factors 34 are estimates, which have been provided by the wearer, for a proportion of the total time the wearer intends to use the progressive addition for an activity requiring the progressive lenses. The lens usage information 24 may also provide a separate measure for the extent to which the wearer uses a computer (for example, using a scale of low to high use).

Thus, in the example illustrated in FIG. 3, Golf is an activity which the wearer has predicted will require 1% of the total predicted lens usage, whereas Reading will require 60% of the total predicted lens usage.

Returning to FIG. 2, and with reference now to the fitting data 28, such data preferably includes the wearer's physical data (such as interpupillary distance (ID)) and frame data for a frame which has been selected for mounting the lenses.

Ideally, the frame data includes frame geometry data (such as frame size and shape, including lens wrap) and frame fitting data (such as vertex and pantoscopic tilt).

In relation to the prescription data 26, such data preferably includes Sphere (Sph), Cylinder (Cyl) and Addition (Add) and may include higher order data such as that provided by wavefront aberration analysis of the wearers eye or other measures of the optical quality of the eye.

In terms of the personal data 30, this data may include includes the age and sex of the wearer.

Having described the lens usage information and the additional data which is preferably obtained from a wearer, the description will now turn to the processing of the lens usage information and the additional data. In this respect, the processing of the wearer data preferably entails translating the wearer data to provide a set of parameters (herein referred to as 'the wearer specification') which is able to be indexed into the lens design database 15 to retrieve a lens design having features which are derived from the wearer specification.

Thus, in the preferred form of the invention the wearer specification preferably includes the following parameters:

sphere (Diopters);
cylinder (Diopters);
addition (Diopters);

wavefront aberrations
inter pupillary distance (mm);
back vertex distance (mm)
pantoscopic tilt (Radians);
frame shape (including lens cut-out shape and lens cut-out size);
face wrap angle relative to a vertical plane which intersects the centre of the frame bridge;
weighted lifestyle score A (Near Use Category);
weighted lifestyle score B (Dynamic Vision Use Category);
computer use index (low to high);
age (years); and
sex (M/F).

Weighted lifestyle scores A and B are scores which have been derived from the processing of the lens usage information 24 for a respective lifestyle score category. More particularly, weighted lifestyle score A is a score for a near vision use lifestyle score category which is derived from an assessment of the frequency of near vision use associated with each activity in the list of activities 32.

Furthermore, weighted lifestyle score B is a score for a dynamic vision lifestyle score category which is derived from an assessment of the relative motion between the wearer and a target for each activity in the list of activities 32.

Weighted lifestyle score A and weighted lifestyle score B are preferably calculated using the computer 4 by first obtaining a separate activity score for each activity in the list of activities 32 from the activity database 14.

As will be described in more detail later, the processing of the lens usage information 24 to provide a weighted lifestyle score for each lifestyle score category relies on a predetermined relationship between the lifestyle score categories and at least one progressive addition lens design feature.

The predetermined relationship may be defined in terms of activity scores which are indicative of the extent to which visual tasks associated with an activity combine to affect the characteristics of a progressive lens design feature having a predetermined relationship with a respective lifestyle score category.

The activity database 14 contains a separate table (herein referred to as a lifestyle category table) for each lifestyle category, each table having a plurality of activities records, each record including at least an activity descriptor field and an activity score field. Thus, a separate activity score is able to be retrieved from the activity database 14 for a particular activity and lifestyle category by querying the activity database 14 and retrieving the activity score from the corresponding activity record from a lifestyle category table. Hence, turning to FIG. 4 there is shown an example of a list of activity scores 34 which have been obtained for the list of activities 32.

In the event that the lens design database does not contain activity scores for a particular activity, an operator may enter data for activities not included in the activity database 14 into the activity database 14 by entering a descriptor for the activity into the database using a descriptor field together with estimates for proportions of one or more task sub-categories for each of a plurality of task categories associated with a particular lifestyle category. Advantageously, the ability to enter data for activities not provided with the activity database 14, provides a user with the ability to tailor the activity database 14 for a particular country or location (for example, by including cultural specific activities).

The following examples are intended to provide non-limiting examples of approaches which may be suitable for entering activity scores into the activity database 14 for the case where an activity score is not already available.

EXAMPLE 1

Entering an Activity Score for the Near Vision Use Category

1. Enter the name of the activity descriptor into the database (for example, 'golf');
2. Enter the working distance of a number (for example, three) visual tasks the activity requires and apportion a percentage (P) of time spent performing each task (for example, visual task 1: viewing the ball in the vicinity of the feet (10%), visual task 2: reading score card (5%), visual task 3: viewing down the fairway (85%));
3. Assign weights (W) for the working distances (for example 0 cm to 49 cm=10 (for example, reading score card), 50 cm to 64 cm=9, 65 cm to 75 cm=8, 76 cm to 90 cm=7, 91 cm to 105 cm=6, 106 cm to 125 cm=5, 126 cm to 200 cm=4 (for example, viewing the ball in the vicinity of the feet), 201 cm to 300 cm=3, 301 cm to 400 cm=2, +401 cm=1 (for example, viewing down the fairway));
4. Multiply each weight (W) by the proportion of time (P) to obtain the activity score (S) as follows:

$$S=W1\cdot P1+W2\cdot P2+W3\cdot P3+\ldots+Wn\cdot Pn$$

where:
W1 and P1 is the working distance and portion of time for visual task 1 (for example, viewing the ball in the vicinity of the feet);
W2 and P2 is the working distance and portion of time for visual task 2 (for example, reading score card);
W3 and P3 is the working distance and portion of time for visual task 3 (for example, viewing down the fairway); and
Wn and Pn is the working distance and portion of time for visual task n;
for example:

$$S=(4\times0.1)+(10\times0.05)+(1\times0.85)$$

$$S=1.75$$

5. Store the resultant near vision use category activity score (A) in the activity database.

EXAMPLE 2

Entering an Activity Score for the Dynamic Vision Use Category

1. Enter the name of the activity descriptor into the database (for example, 'golf');
2. Enter the proportion of a number (for example, two) of visual sub-tasks the activity requires and categorise each sub-task according to the following criteria together with a score as follows:
   Subject posture: sitting/stationary=1, walking=5, running=10.
   Subject motion: stationary=1, moving at walking pace=5, moving at running pace=7, moving faster than running pace=10;
   Head Turn: required=5.visual target motion; and not required=1.visual target motion.
3. Calculate an activity score (S) as the sum of the scores for all the categories or if more than one sub-task is entered, as the proportional sum of the n tasks.

4. Store the resultant dynamic vision use category activity score (S) in the activity database.

Having retrieved the activity scores from the activity database, the programmed computer 4 is then able to calculate weighted lifestyle scores for each activity score category using the sum of the products of the activity scores and the lens usage factors for each activity. The resultant weighted lifestyle scores are then included in the wearer specification.

The computer 4 then uses the wearer specification to generate a database query which is able to be used to query the lens design database 15 using a query process.

The generated database query may be structured so as to use some, or all, of the parameters contained in the wearer specification. Indeed, the generated query may be generated in response to a user designating specific parameters for use in the query. Alternatively, the user may specify a particular aspect of the lens design for optimisation.

In this way, the system is able to be used to dispense single vision and multi-focal lenses as well as progressive addition lenses. By way of example, in the event that a dispenser wishes to dispense single vision lenses for a wearer, the wearer specification could omit the weighted lifestyle scores from the wearer specification.

In response to the database query, if the lens design database has a lens design record having parameters which match with those parameters in the database query, lens product data is retrieved from the lens design record. The lens product data may be used to identify a particular progressive lens product.

Alternatively, the query process may select a semi-finished progressive lens product which is able to be customised to provide a lens having design features which comply with the wearer specification.

Thus, the selected or customised progressive lens design product will have design features which have a dependency on the wearer specification parameters.

Table 1 shows the relationship between the progressive addition lens design features and the parameters which may be included in the wearer's specification. In this respect, each parameter may be used to manipulate one or more lens design features. Thus, the groupings are provided for communications purposes and are not meant to exclude any cross pairing at any level.

In the event that the query process is unable to identify a lens design which matches with, or is able to be customised to match with, the wearer's specification, the computer 4 may generate a lens manufacturing file which is able to be used to manufacture a fully customised lens. In this case, the computer 4 is able to communicate the lens manufacturing file to a lens manufacturer having a server 20 (refer FIG. 1) over the network 6 (refer to FIG. 1).

It will thus be recognised that the present invention provides a process for selecting or designing a lens in response to data obtained from a wearer so that the lens design is dispensed to the wearer which matches their lifestyle needs. In particular, it is envisaged that the present invention will be well suited to dispensing progressive addition lenses.

Finally, it will be understood that there may be other variations and modifications to the configurations described herein that are also within the scope of the present invention.

TABLE 1

| Data | Parameter | Design Feature/s |
|---|---|---|
| Prescription Data | Sphere (Sph) | Base curve |
| | Cylinder (Cyl) | Distance and near asphertisation |
| | Addition (Add) | Material |
| Fitting Data | Inter Pupillary Distance (PD) | Near and Distance inset |
| | Vertex | Rx power compensation (near, int, dist) |
| | Pantoscopic Tilt | Rx power compensation (near, int, dist) |
| | Frame size and shape | PAL corridor length<br>Lens material<br>Lens availability<br>Design of periphery<br>Lens wrap |
| Lens Usage information | Activity Score - Near Use | Zone size balance<br>Near vs distance boundary gradients |
| | Activity Score - Dynamic Use | Periphery optimisation<br>Lens Material |
| | Computer Use | Intermediate zone<br>Tints<br>Anti-reflective (AR) coat |
| Personal Data | Age | AR coats<br>Tints<br>Addition power |
| | Sex | Basic design<br>AR coat<br>Tints<br>Treatments |
| Sampled Behaviour Data | Eye turn and declination | Zone width as a function of eye declination<br>Corridor width |
| | Reading distance | Eye path inset profile |

The invention claimed is:

1. A process of selecting and/or designing ophthalmic lenses for a wearer, the process including the steps of:

(a) obtaining lens usage information from the wearer, wherein the lens usage information includes:

(i) a list of activities for which the wearer intends to wear the ophthalmic lenses; and (ii) for each listed activity, a lens usage factor which is indicative of a proportion of time that the wearer intends to use the ophthalmic lenses for each of the listed activities;

(b) entering the lens usage information into a programmed computer;

(c) the programmed computer processing the lens usage information to provide a separate weighted lifestyle score for each of one or more respective lifestyle score categories, each weighted lifestyle score being a function of a predetermined relationship between the respective lifestyle score category and at least one ophthalmic lens design feature, wherein the processing of the lens usage information to provide a weighted lifestyle score for a respective lifestyle score category includes the steps of:

(i) obtaining a separate activity score for each activity in the list of activities;

(ii) calculating a separate proportional score for each activity, wherein each proportional score is calculated using the product of the activity score and the respective lens usage factor; and (iii) calculating the weighted lifestyle score for the list of activities, wherein the weighted lifestyle score is calculated using the sum of the separate proportional scores; and (d) the programmed computer selecting or designing an ophthalmic lens design using one or more of the weighted lifestyle scores; wherein the selected or designed ophthalmic lens has at least one lens design feature which has been customized using one or more of the weighted lifestyle scores.

2. A process according to claim 1 wherein the types of lenses which are able to be selected or designed includes:

(a) progressive addition lenses; and/or (b) single vision lenses; and/or (c) multi-focal lenses.

3. A process according to claim 1 wherein the lens usage information further includes information which is indicative of the importance of each of the listed activities to the wearer.

4. A process according to claim 1 wherein a lifestyle score category is provided for a frequency of near vision use.

5. A process according to claim 1 wherein a lifestyle score category is provided for a frequency of dynamic vision use.

6. A process according to claim 5 wherein activity scores for the frequency of dynamic vision use lifestyle category are derived from an assessment of the relative motion between the wearer and a target for each activity.

7. A process according to claim 1 wherein each lifestyle score category includes at least one task category and wherein each at least one task category further includes a range of task subcategories, each task subcategory having a task score.

8. A process according to claim 7 wherein the process of obtaining a separate activity score for a particular activity and activity category preferably includes:

(a) categorizing the activity using at least one task subcategory according to the visual requirements of the activity;

(b) calculating a subcategory proportional score for each task subcategory using the product of the task score and a proportional factor; and (c) calculating an activity score for each activity, wherein the activity score is the sum of the subcategory proportional scores.

9. A process according to claim 1 wherein the step of obtaining a separate activity score for each activity in the list of activities for a particular lifestyle score category is performed by accessing a database which contains pre-calculated activity scores for a range of activities.

10. A process according to claim 9 wherein the database resides on the programmed computer.

11. A process according to claim 9 wherein the database resides on a server which is accessible to the programmed computer via a network.

12. A process according to claim 9 wherein the database includes a separate table for each lifestyle score category.

13. A process according to claim 12 wherein each lifestyle score category table includes a plurality of activity records, each activity record being for a particular activity and having an activity score value.

14. A process according to claim 13 wherein a separate activity score is obtained for a particular activity and lifestyle category by querying the database and retrieving the activity score from the corresponding activity record from a lifestyle category table.

15. A process according to claim 1 wherein the processing of the lens usage information to provide a weighted lifestyle score for a respective lifestyle score category preferably includes the steps of:

(a) accessing a database, the database containing pre-calculated activity scores for a plurality of activities;

(b) retrieving a pre-calculated activity score from the database for each activity;

(c) calculating one or more proportional activity scores for each activity using the retrieved activity score and the respective proportional factor; and (d) calculating one or more weighted lifestyle scores, each weighted lifestyle score being calculated using the proportional activity scores.

16. A process according to claim 15 wherein where the database does not contain activity scores for a particular activity, an operator is able to enter data for activities not included in the database into the database, the step of adding data for an activity to the database including:

(a) entering a descriptor for the activity into the database using a descriptor field;

(b) entering and/or selecting at least one task category for linking with the activity descriptor, wherein the at least one task category is associated with a lifestyle score category;

(c) for each task category, entering estimates for the proportions of one or more task sub-categories for each task category;

(d) the programmed computer calculating an activity score for each activity score category associated with the activity descriptor using the task sub-category proportional estimates and respective task scores; and (e) storing each activity score together with the activity descriptor in the database.

17. A process according to claim 1 wherein the step of selecting an ophthalmic lens design using one or more of the weighted lifestyle scores includes selecting a lens design from a pre-existing matrix of lens designs.

18. A process according to claim 1 wherein the step of selecting or designing an ophthalmic lens design using one or more of the weighted lifestyle scores includes:

(a) selecting a lens design from a pre-existing range of lens designs according to one or more of weighted lifestyle scores; and (b) modifying the selected lens design according to other data obtained for the wearer; wherein the other wearer data includes one or more of:

fitting data;

lens prescription data;

personal data;

sampled behavioral data; and one or more lifestyle scores for other categories.

19. A process according to claim 1 wherein the step of selecting an ophthalmic lens design using one or more of the weighted lifestyle scores includes querying a database to locate and retrieve at least one available ophthalmic lens design having a lifestyle score value which matches one or more of the weighted lifestyle scores.

20. A process according to claim 1 wherein the selecting or designing an ophthalmic lens design using one or more of the weighted lifestyle scores includes creating a data file which is able to be used to fabricate a customized lens design.

21. A process according to claim 1 wherein the step of obtaining lens usage information from a wearer also includes obtaining other data from a wearer, the other data including one or more of:

(a) fitting data;

(b) lens prescription data;

(c) personal data; and (d) sampled behavioral data.

22. A process according to claim 21 wherein the step of entering lens usage information further includes entering the other data, the other data being processed together with the lens usage information, and wherein the processing of the lens usage information includes processing the other data to thereby select or design a lens design according to the one or more of the weighted lifestyle scores and the other data.

23. An ophthalmic lens which has been selected or designed according to the process of claim 1.

24. A process according to claim 18 or 21 wherein the fitting data includes one or more of:

(a) interpupillary distance;

(b) vertex distance (VD); and (c) frame geometry.

25. A process according to claim 18 or 21 wherein the lens prescription data includes one or more of:

(a) sphere (Rx);

(b) cylinder (Cyl); and (c) addition (Add).

26. A process according to claim 18 or 21 wherein the personal data includes one or more of:

(a) age of the wearer; and (b) gender information of the wearer.

27. A process according to claim 18 or 21 wherein the sampled behavioral data includes measured data which describes eye turn and eye declination of the wearer during specific visual exercises.

28. A process according to claim 18 or 21 wherein the sampled behavioral data includes measured data which describes accommodation and reading distance, the accommodation and the reading distance being measured using specific visual exercises.

29. A process according to claim 24 wherein the frame geometry data includes one or more of:

(a) frame shape, including:

(i.) lens cut-out shape; and (ii.) lens cut-out size;

(b) pantoscopic tilt; and (c) face wrap angle relative to a vertical plane which intersects the centre of the frame bridge; and wherein the frame geometry data is data for a frame in which the lens will be mounted.

* * * * *